United States Patent
Lee et al.

(10) Patent No.: US 9,237,196 B2
(45) Date of Patent: Jan. 12, 2016

(54) METHOD AND APPARATUS FOR SETTING UP GATEWAY FOR AUTOSAR-BASED VEHICLE NETWORK

(75) Inventors: Joo-Chul Lee, Daejeon (KR);
Jeong-Hwan Lee, Hwaseong-si (KR);
Hyun-Yong Hwang, Daejeon (KR);
Tae-Man Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 770 days.

(21) Appl. No.: 13/562,444

(22) Filed: Jul. 31, 2012

(65) Prior Publication Data
US 2013/0124703 A1     May 16, 2013

(30) Foreign Application Priority Data
Nov. 11, 2011 (KR) .................. 10-2011-0117723

(51) Int. Cl.
*G06F 15/177* (2006.01)
*H04L 29/08* (2006.01)
*H04L 12/24* (2006.01)

(52) U.S. Cl.
CPC .............. *H04L 67/12* (2013.01); *H04L 41/145* (2013.01)

(58) Field of Classification Search
CPC ............... H04L 2012/40273; H04L 12/4625; H04L 2012/40215; H04L 12/4006; H04L 12/66; H04L 2012/40241; H04L 41/0893; H04L 63/08; H04L 63/102; H04L 69/08; H04L 41/0806; H04L 67/12; H04L 41/14; H04L 41/145; H04W 24/00; B60R 16/0315; B60R 16/02; B60R 16/0231; G06F 21/45; G06F 17/00

USPC .......... 370/1, 241, 254; 701/36, 1, 32.7, 31.4, 701/34.4; 709/218; 455/418
See application file for complete search history.

(56) References Cited

U.S. PATENT DOCUMENTS

| | | | |
|---|---|---|---|
| 2010/0162203 A1 | 6/2010 | Kim et al. | |
| 2010/0292867 A1* | 11/2010 | Bohm et al. | 701/1 |
| 2011/0022809 A1* | 1/2011 | Satoh et al. | 711/155 |
| 2012/0084482 A1* | 4/2012 | Yamanaka et al. | 710/305 |
| 2012/0218412 A1* | 8/2012 | Dellantoni et al. | 348/148 |

FOREIGN PATENT DOCUMENTS

KR    2010-0071361 A    6/2010

OTHER PUBLICATIONS

"The 'Electrifying' Side of Autosar: The Case for Using the ECU Resource Template," by Hans-Jurgan Mantsch, Mentor Graphics, Jul. 22, 2010, pp. 1-9.*
AUTOSAR Specification of Communication, v2.0.1, Jun. 27, 2006, pp. 1, 14, 32 and 70-71 of 116.*

\* cited by examiner

*Primary Examiner* — Marcus R Smith
*Assistant Examiner* — Rose Clark
(74) *Attorney, Agent, or Firm* — Rabin & Berdo, P.C.

(57) ABSTRACT

The present invention provides a method and apparatus for setting up a gateway for an AUTOSAR-based vehicle network. The apparatus for setting up the gateway includes a candidate selection unit for selecting an Electronic Control Unit (ECU) connected to at least two communication clusters, from among a plurality of ECUs, as a gateway candidate, and a gateway generation unit for generating a gateway instance with reference to the ECU selected by the candidate selection unit, and generating a gateway meta-model including the gateway instance based on instance generation input values entered by a user.

13 Claims, 14 Drawing Sheets

METHOD AND APPARATUS FOR SETTING UP GATEWAY FOR AUTOSAR-BASED VEHICLE NETWORK

CROSS REFERENCE TO RELATED APPLICATION

This application claims the benefit of Korean Patent Application No. 10-2011-0117723, filed on Nov. 11, 2011, which is hereby incorporated by reference in its entirety into this application.

BACKGROUND OF THE INVENTION

1. Technical Field

The present invention relates generally to a method and apparatus for setting up a gateway for an AUTomotive Open System ARchitecture (AUTOSAR)-based vehicle network. More particularly, the present invention relates to a method and apparatus for setting up a gateway for an AUTOSAR-based vehicle network, which can more easily set up the gateway for the vehicle network based on AUTOSAR.

2. Description of the Related Art

An automotive electronics software platform standard (AUTomotive Open System Architecture, hereinafter referred to as "AUTOSAR") is a standard pertaining to an automotive electronics software architecture which was established by a partnership between vehicle manufacturers and manufacturers for related parts and electronics application development tools.

AUTOSAR provides an architecture and development methodology for automotive electronics software and Application Programming Interfaces (APIs) for electronics applications.

The automotive electronics software architecture provided by AUTOSAR includes coverage of the structures of applications, network structures/communication data between Electronic Control Units (ECUs) on which applications are to be mounted, the structure of lower-layer platform modules that support application software to be loaded onto respective ECUs, and methods of setting up the platform modules.

In order to implement such standards with actual software, AUTOSAR defines and provides meta-models required to describe products obtained by respective development methodologies.

However, the provided meta-models may be important information to persons who design AUTOSAR-related platforms or tools, but the actual information to which the meta-models are to be applied is important to persons who develop electronics applications by using actual tools and platforms of AUTOSAR. Therefore, how intuitive or easily understandable a provided interface is when setting up meta-models may be a performance index of AUTOSAR development tools that is important.

In this way, the current AUTOSAR properly defines and provides meta-models, but a guide for indicating how to properly configure such meta-models in practice has not yet been proposed.

SUMMARY OF THE INVENTION

Accordingly, the present invention has been made keeping in mind the above problems occurring in the prior art, and an object of the present invention is to provide a method and apparatus for setting up a gateway for an AUTOSAR-based vehicle network, which can more easily set up a gateway model for a vehicle network by using an AUTOSAR-based development tool.

In accordance with an aspect of the present invention to accomplish the above object, there is provided an apparatus for setting up a gateway for an AUTomotive Open System ARchitecture (AUTOSAR)-based vehicle network, including a candidate selection unit for selecting an Electronic Control Unit (ECU) connected to at least two communication clusters, from among a plurality of ECUs, as a gateway candidate; and a gateway generation unit for generating a gateway instance with reference to the ECU selected by the candidate selection unit, and generating a gateway meta-model including the gateway instance based on instance generation input values entered by a user.

Preferably, the gateway generation unit may include an instance generation unit for generating the gateway instance based on a context menu of the ECU.

Preferably, the instance generation unit may be configured to generate a frame mapping instance for performing mapping between frames including source Interaction layer Protocol Data Units (IPdus) and target IPdus, based on the instance generation input values, generate an IPdu mapping instance for establishing a mapping relationship between IPdus by mapping a source IPdu and a target IPdu contained in an identical frame to each other, and generate a signal mapping instance for setting up locations at which signals are to be transferred to a communication cluster of the target IPdu when the source IPdu and the target IPdu contained in the identical frame are mapped to each other.

Preferably, the gateway generation unit may include a frame mapping unit for establishing a mapping relationship between the frames including the source IPdus and the target IPdus by referring to a previously generated frame triggering instance based on the frame mapping instance.

Preferably, the IPdu mapping instance may include a source IPdu reference instance corresponding to the source IPdu contained in the identical frame and a target IPdu reference instance corresponding to the target IPdu contained in the identical frame, and the gateway generation unit comprises an IPdu mapping unit for establishing a mapping relationship between the source IPdu and the target IPdu by referring to a previously generated IPdu triggering instance based on the source IPdu reference instance and the target IPdu reference instance.

Preferably, the gateway generation unit may include a signal mapping unit for setting up locations of signals that are to be transferred to the communication cluster of the target IPdu by referring to a previously generated signal triggering instance based on the signal mapping instance.

Preferably, the apparatus may be based on AUTomotive Open System ARchitecture (AUTOSAR).

Preferably, the instance generation unit may include an instance generation screen having a plurality of input blocks for receiving the instance generation input values entered by the user.

Preferably, the plurality of ECUs may be generated during a procedure of setting up a vehicle network structure model and a communication data structure model in advance before the gateway meta-model is generated.

In accordance with another aspect of the present invention to accomplish the above object, there is provided a method of setting up a gateway for an AUTomotive Open System ARchitecture (AUTOSAR)-based vehicle network, including selecting an Electronic Control Unit (ECU) connected to at least two communication clusters, from among a plurality of ECUs, as a gateway candidate; generating a gateway instance with reference to the ECU; and generating a gateway meta-model including the gateway instance based on instance generation input values entered by a user.

Preferably, the generating the gateway instance may include generating the gateway instance based on a context menu of the ECU.

Preferably, the generating the gateway meta-model may include generating a frame mapping instance for performing mapping between frames including source Interaction layer Protocol Data Units (IPdus) and target IPdus, based on the instance generation input values; generating an IPdu mapping instance for establishing a mapping relationship between IPdus by mapping a source IPdu and a target IPdu contained in an identical frame to each other; and generating a signal mapping instance for setting up locations at which signals are to be transferred to a communication cluster of the target IPdu when the source IPdu and the target IPdu contained in the identical frame are mapped to each other.

Preferably, the generating the frame mapping instance may include referring to a previously generated frame triggering instance based on the frame mapping instance; and establishing a mapping relationship between the frames including source IPdus and target IPdus which will be used in different communication clusters.

Preferably, the generating the IPdu mapping instance may include generating a source IPdu reference instance corresponding to the source IPdu; generating a target IPdu reference instance corresponding to the target IPdu; and establishing a mapping relationship between the source IPdu and the target IPdu by referring to a previously generated IPdu triggering instance based on the source IPdu reference instance and the target IPdu reference instance.

Preferably, the generating the signal mapping instance may include setting up locations of signals that are to be transferred to the communication cluster of the target IPdu by referring to a previously generated triggering instance based on the signal mapping instance.

In accordance with embodiments of the present invention, the method and apparatus for setting up the gateway for the AUTOSAR-based vehicle network allow an electronics application developer to more easily set up the gateway model of the vehicle network even if the developer does not know the configuration of a complicated network architecture model based on AUTOSAR.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
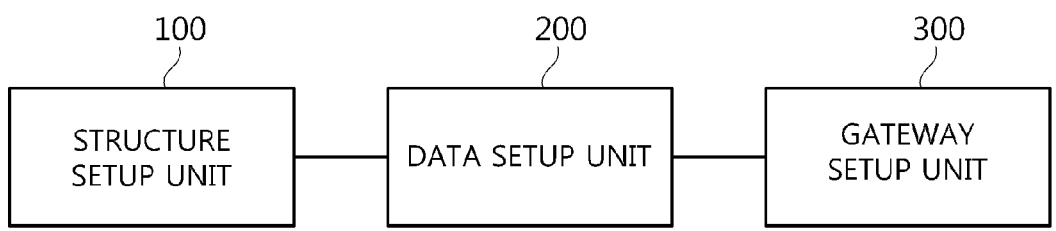
FIG. 1 is a diagram schematically showing the configuration of an apparatus for setting up a gateway for an AUTOSAR-based vehicle network according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, a method and apparatus for setting up a gateway for an AUTOSAR-based vehicle network according to an embodiment of the present invention will be described in detail with reference to the attached drawings. The method and apparatus for setting up a gateway for an AUTOSAR-based vehicle network according to the embodiment of the present invention are based on a software platform standard for automotive electronics (automotive open system architecture, hereinafter referred to as "AUTOSAR"), but the present invention is not limited thereto.

FIG. 1 is a block diagram schematically showing the construction of an apparatus for setting up a gateway for an AUTOSAR-based vehicle network according to an embodiment of the present invention.

Referring to FIG. 1, the gateway setup apparatus for the AUTOSAR-based vehicle network according to the embodiment of the present invention includes a structure setup unit 100, a data setup unit 200, and a gateway setup unit 300.

The structure setup unit 100 receives structure setup input values from a user, generates electronic control units (hereinafter referred to as "ECUs") corresponding to the components of vehicle network communication, and allocates communication channels between the ECUs. That is, the structure setup unit 100 sets up Unified Modeling Language (UML) code corresponding to a network structure model based on the allocated communication channels between the ECUs.

Figure 2:
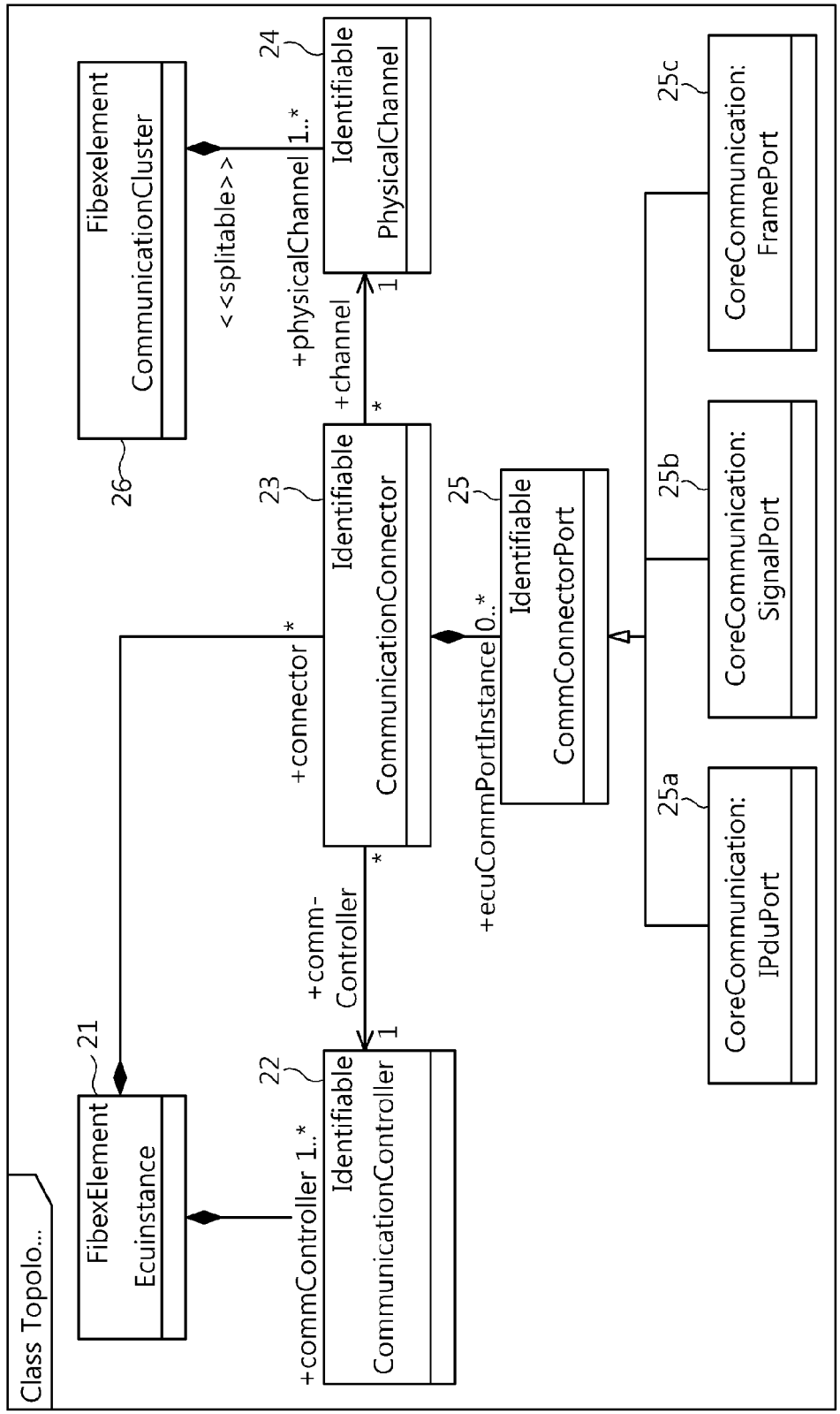
FIGS. 2 and 3 are diagrams showing a network model based on AUTOSAR according to an embodiment of the present invention.
Figure 3:
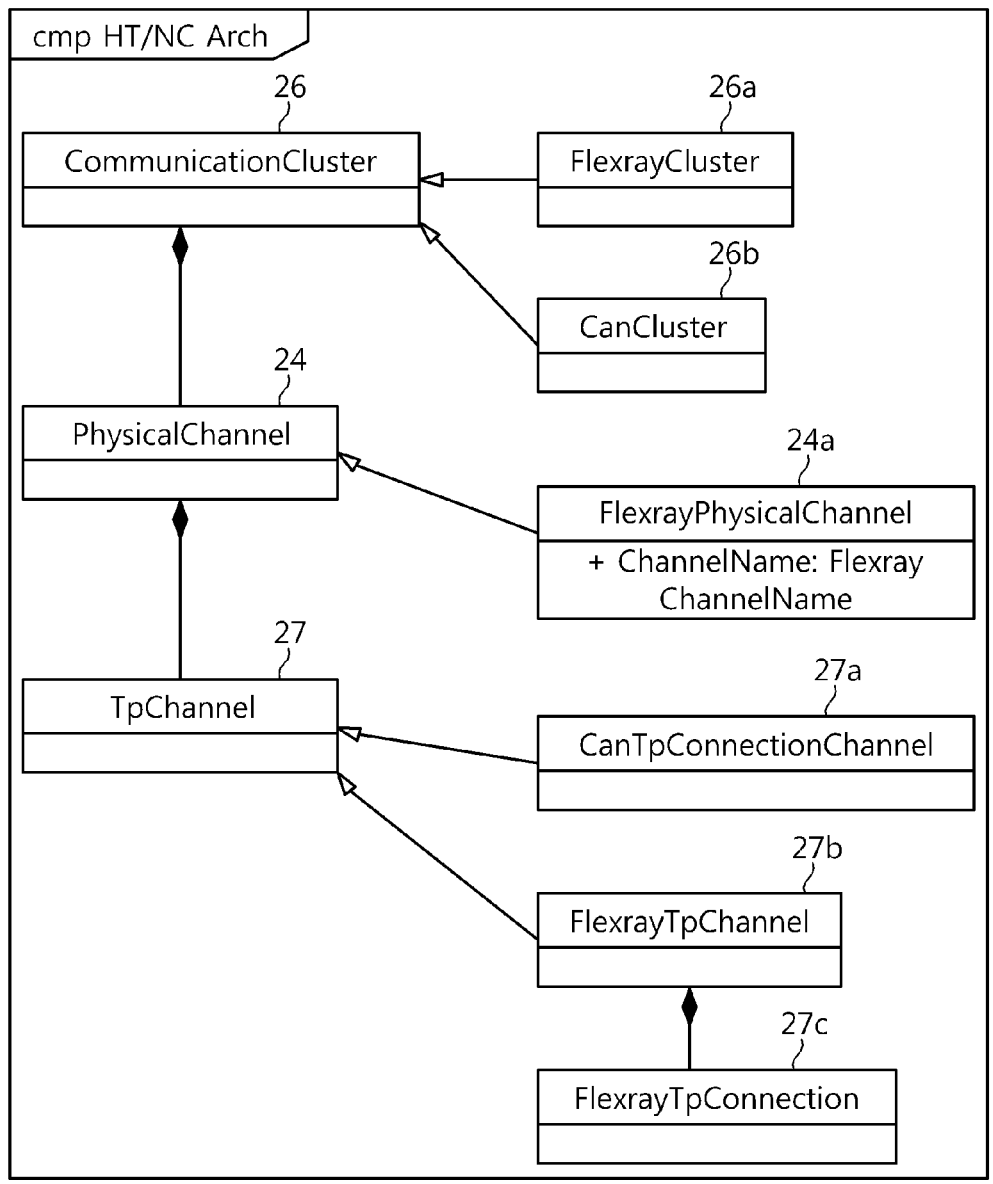

A network model 20 based on AUTOSAR according to an embodiment of the present invention may have the forms shown in FIGS. 2 and 3, but the form of the network model 20 is not limited thereto.

Referring to FIGS. 2 and 3, the structure of the network model 20 includes ECU instances (EcuInstance) 21, communication controller blocks (CommunicationController) 22, communication connector blocks (CommunicationConnector) 23, physical channels (PhysicalChannel) 24, connector port blocks (CommConnectorPort) 25, communication cluster blocks (CommunicationCluster) 26, and Transport layer (Tp) channel blocks (TpChannel) 27.

The ECU instances 21 correspond to instances included in the ECUs with one ECU instance included in each ECU, and operate in conjunction with the plurality of communication controller blocks 22 and communication connector blocks 23.

The communication controller blocks 22 are controller blocks corresponding to the interfaces of a vehicle network, for example, FlexRay or Controller Area Network (CAN).

The communication connector blocks 23 are generated when the ECU intends to perform communication by using a specific physical channel 24. That is, such a communication connector block 23 corresponds to a connection node between the ECU and the specific physical channel 24. Here, the physical channel 24 includes a FlexRay physical channel 24a. Further, each communication connector block 23 has a corresponding connector port block 25.

Each connector port block 25 includes the directionality of reception (in) and transmission (out) with respect to the physical channel 24.

Each communication cluster block 26 includes a FlexRay cluster (FlexrayCluster) 26a and a CAN cluster (CanCluster) 26b.

Each TP channel block 27 includes a CanTp connection channel (CanTpConnectionChannel) 27a and a FlexRayTp channel (FlexrayTpChannel) 27b. Here, the FlexRayTp channel 27b includes a FlexrayTp connection block (FlexrayTpConnection) 27c.

The above-described network model 20 based on AUTOSAR shown in FIGS. 2 and 3 is disclosed in detail in the specification of the System Template V3.1.0 of AUTOSAR, and thus a detailed description thereof is omitted here.

Referring back to FIG. 1, the data setup unit 200 sets up the data that is to be transmitted via a communication channel between the ECUs, using a specific wizard. Here, the wizard corresponds to software for easily and conveniently executing complicated software or hardware operations using an interrogatory method, and includes a system signal wizard (SystemSignal Wizard) by an Interaction layer Protocol Data Unit (IPdu) wizard, a frame wizard, etc.

Figure 4:
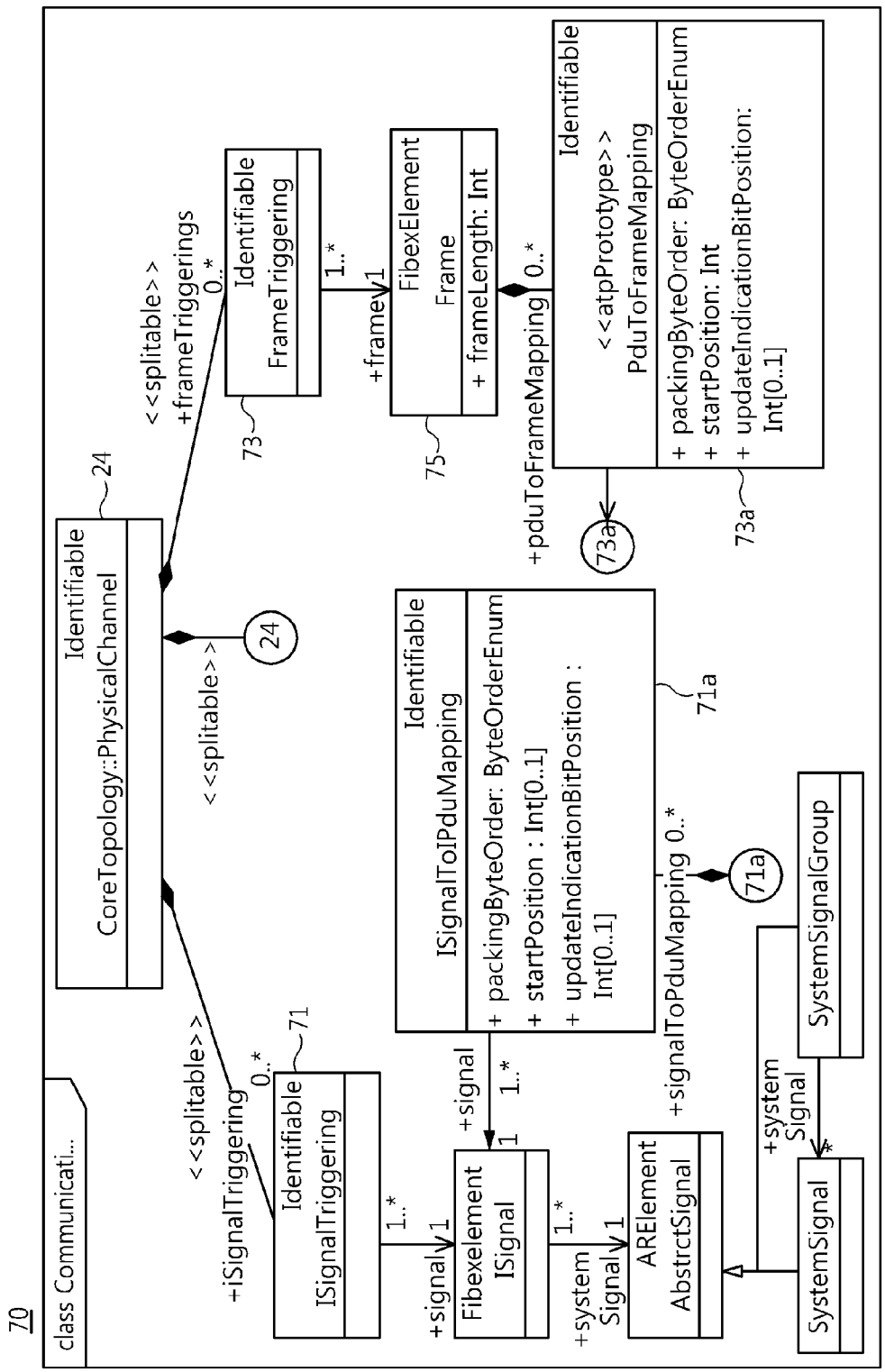
FIGS. 4 to 7 are diagrams showing a communication data model based on AUTOSAR according to an embodiment of the present invention.
Figure 5:
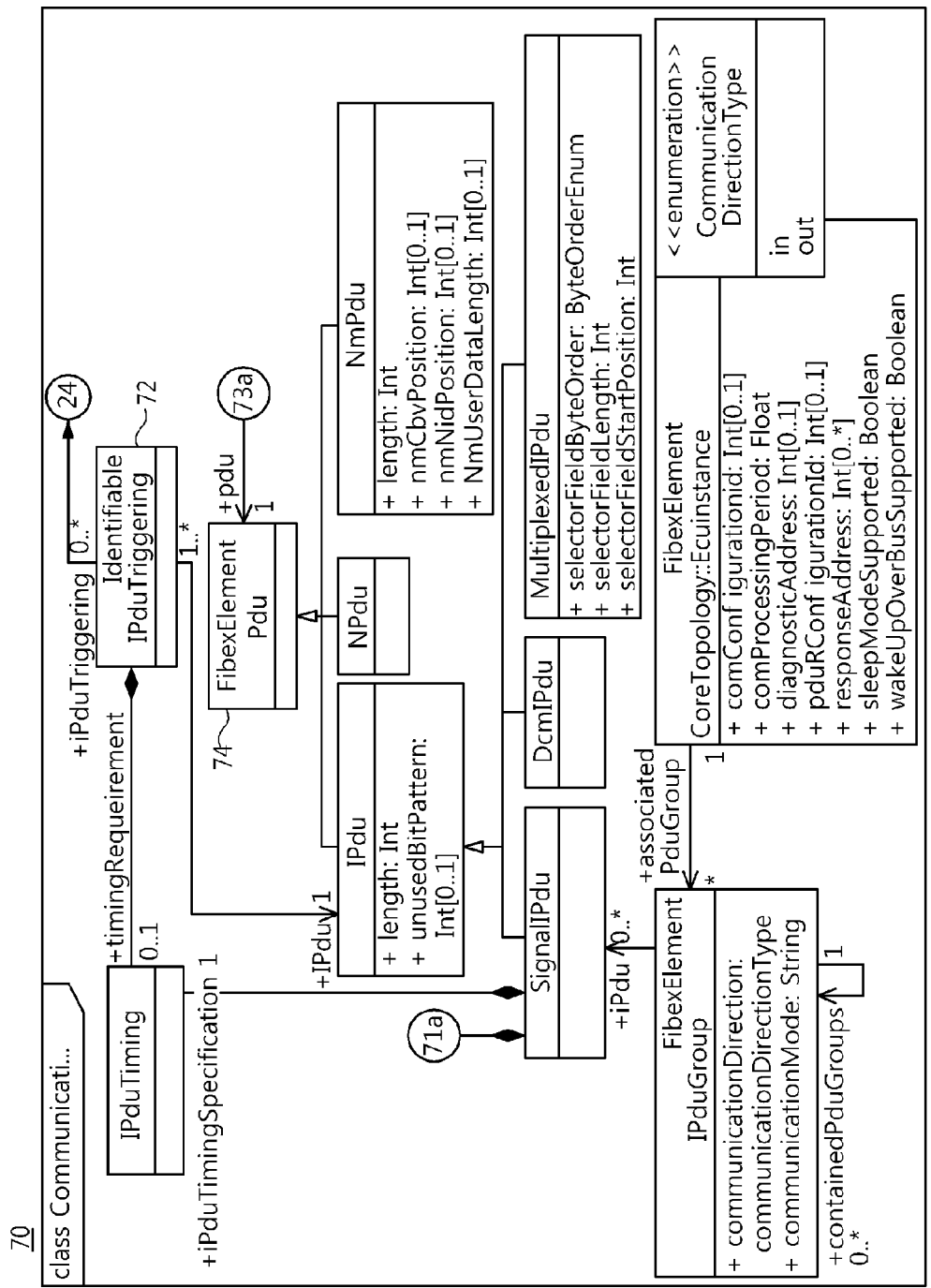

A communication data model based on AUTOSAR according to an embodiment of the present invention has the forms shown in FIGS. 4 to 7. FIGS. 4 and 5 are diagrams showing a single communication data model 70.

Referring to FIGS. 4 to 7, the communication data model 70 includes a physical channel (PhysicalChannel) 24 which is generated during the procedure of setting up a network structure.

The physical channel 24 in the communication data model 70 includes triggering instances (or objects) corresponding to instances that are to be transmitted through the physical channel 24. Here, the triggering instances include a signal (interaction signal) triggering instance (ISignalTriggering) 71, an IPdu triggering instance (IPduTriggering) 72, and a frame triggering instance (FrameTriggering) 73.

The signal triggering instance 71 includes only time information about signals.

The IPdu triggering instance 72 includes information about a channel through which a specific IPdu 74 is being transmitted.

The frame triggering instance 73 includes information about a frame which is to be transmitted through a specific channel.

The signal triggering instance 71 and the IPdu triggering instance 72 are used when a specific ECU functions as a gateway. However, the frame triggering instance 73 is generally used for data transmission. In an embodiment of the present invention, the step of setting up the gateway will be described in detail later.

Figure 6:
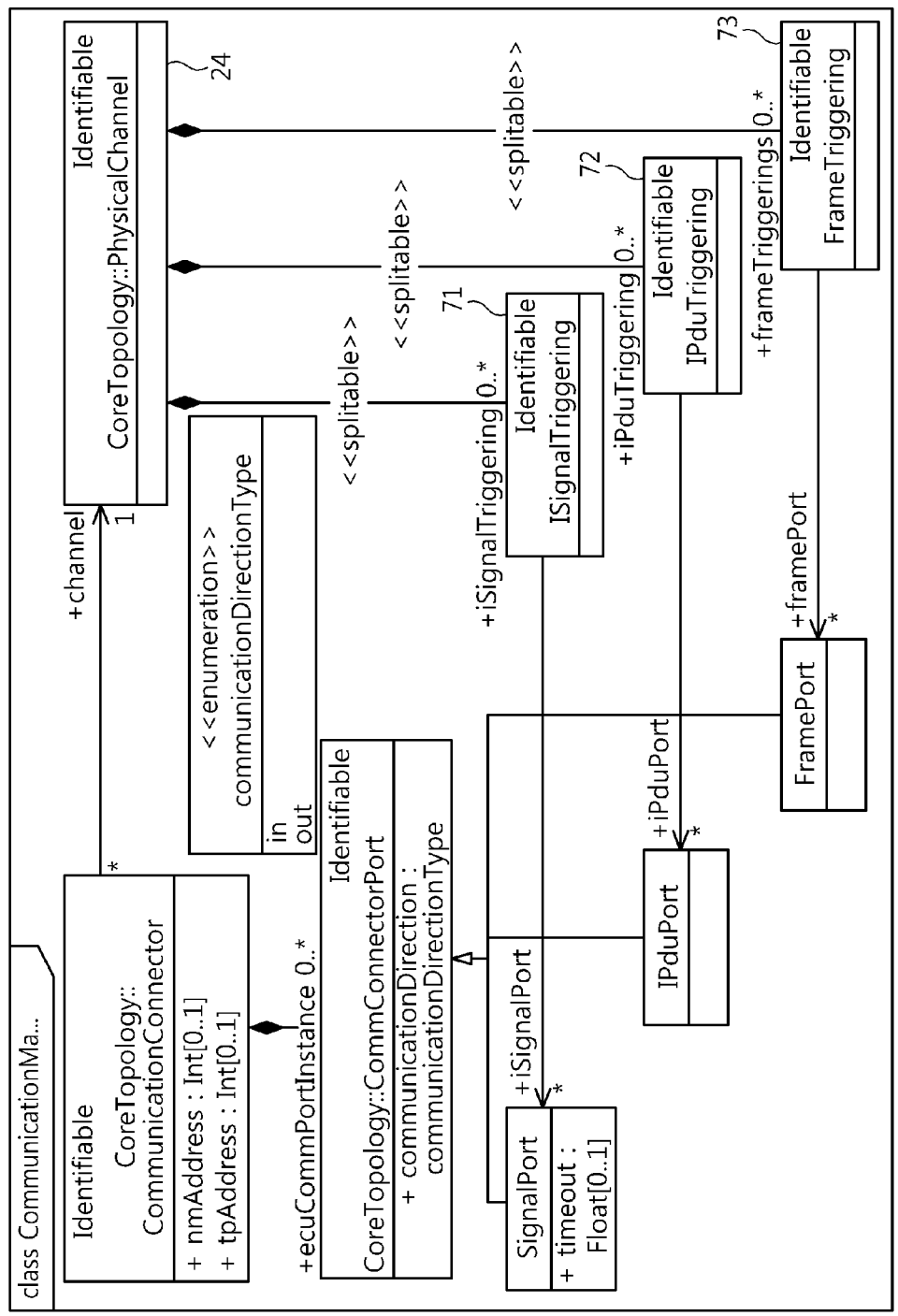
Figure 7:
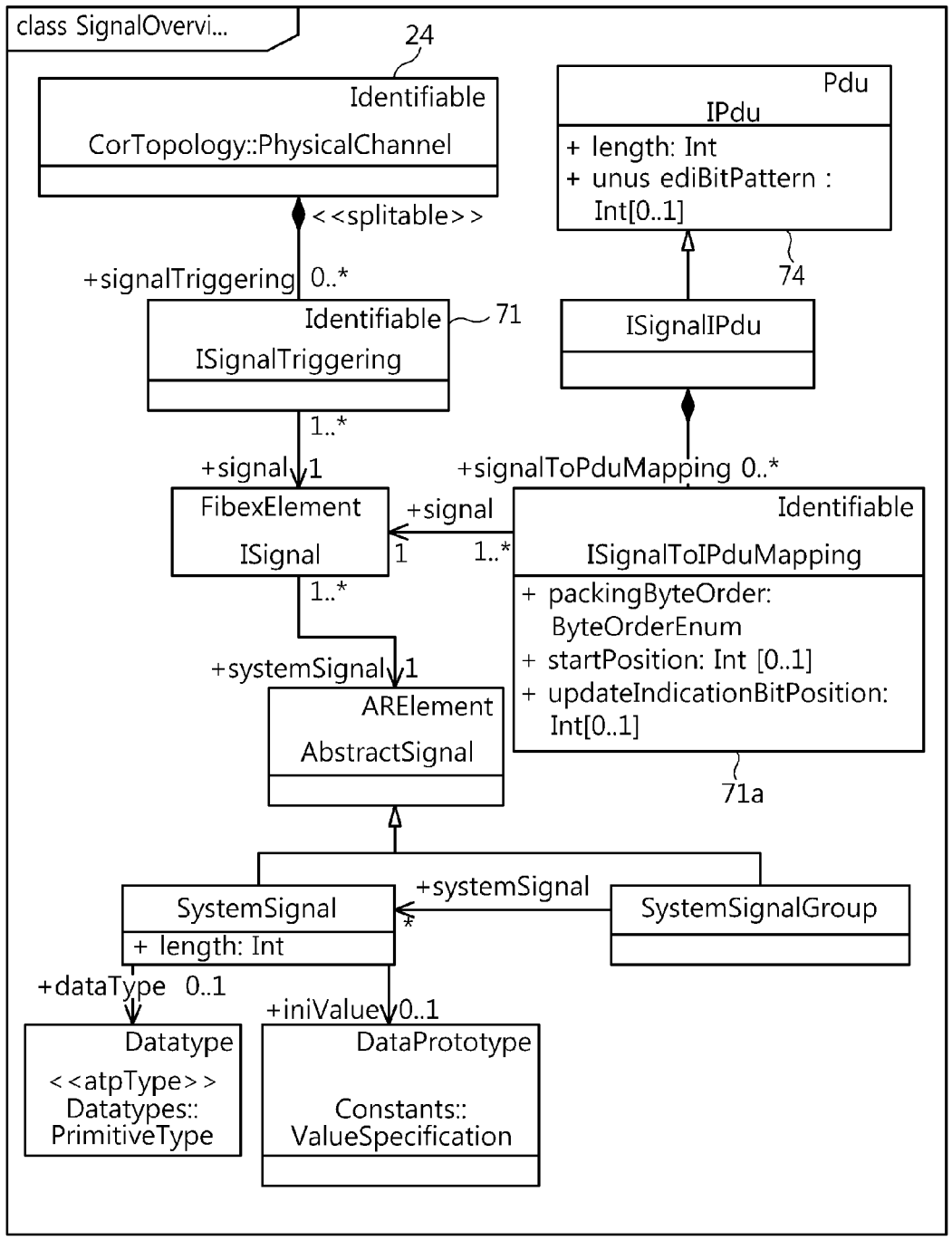

For example, data that is transmitted or received in an electronics application program is represented by signals, as shown in FIG. 7. Referring to FIGS. 4 and 7, system signals (hereinafter used together with "signal") are transferred to the communication module of the ECU with the system signals included in the IPdu 74. The IPdu 74 transferred in this way is finally generated in the format of frames for respective bus types, and the generated frames are transmitted to the corresponding buses. That is, the system signals are referred to by the IPdu 74 via an Interaction (I) signal-to-IPdu mapping instance (ISignalToIPduMapping) 71a. The IPdu 74 is referred to by a frame 75 via a Pdu-to-frame mapping instant (PduToFrameMapping) 73a. Then the frame 75 is referred to by the frame triggering instance 73. As shown in FIG. 6, in the frame 75, the final source and destination are determined by referring to ports possessed by the communication connector block 23 generated by the structure setup unit 100.

The above-described communication data model 70 based on AUTOSAR as shown in FIGS. 4 and 7 is disclosed in detail in the specification of the System Template V3.1.0 of AUTOSAR, and thus a detailed description thereof will be omitted.

Referring back to FIG. 1, the gateway setup unit 300 sets up an ECU gateway based on the information set up during the procedure of setting up the network and communication data. In this case, since the ECU functions as the gateway, the gateway refers to an ECU instance which will function as the gateway and which is generated during the procedure of setting up the network structure.

Figure 8:
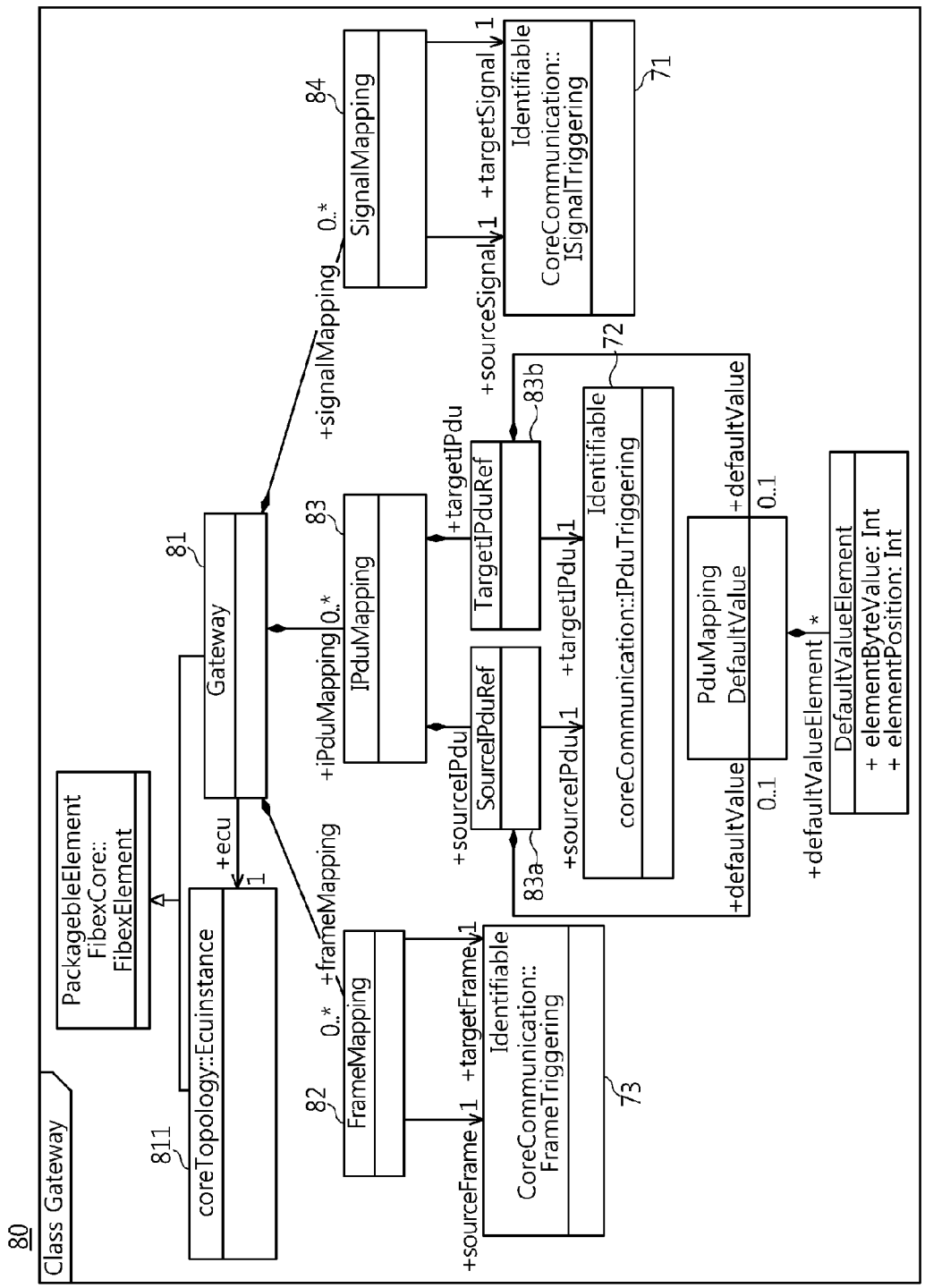
FIGS. 8 to 10 are diagrams showing a gateway meta-model based on AUTOSAR according to an embodiment of the present invention.
Figure 9:
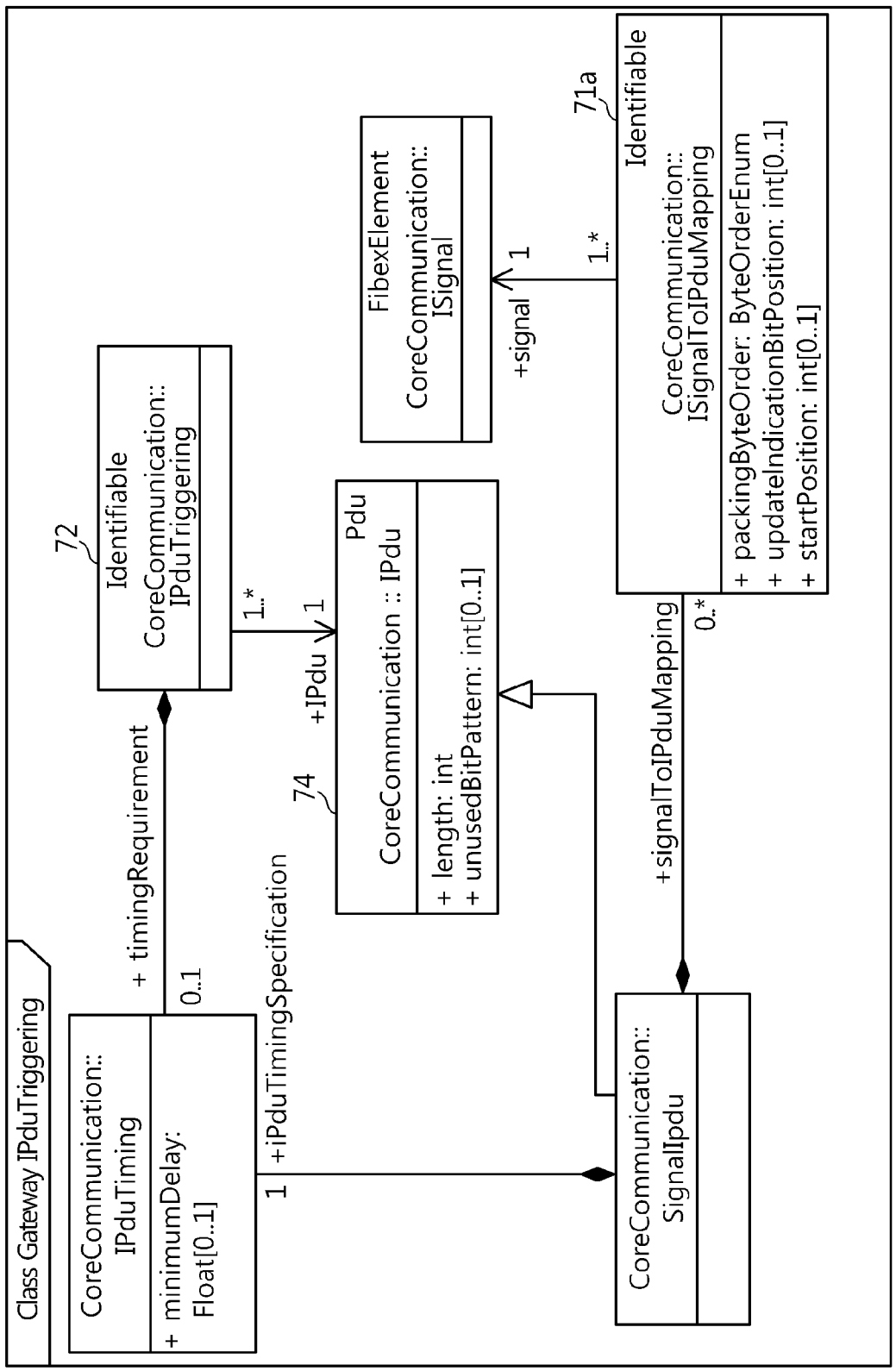
Figure 10:
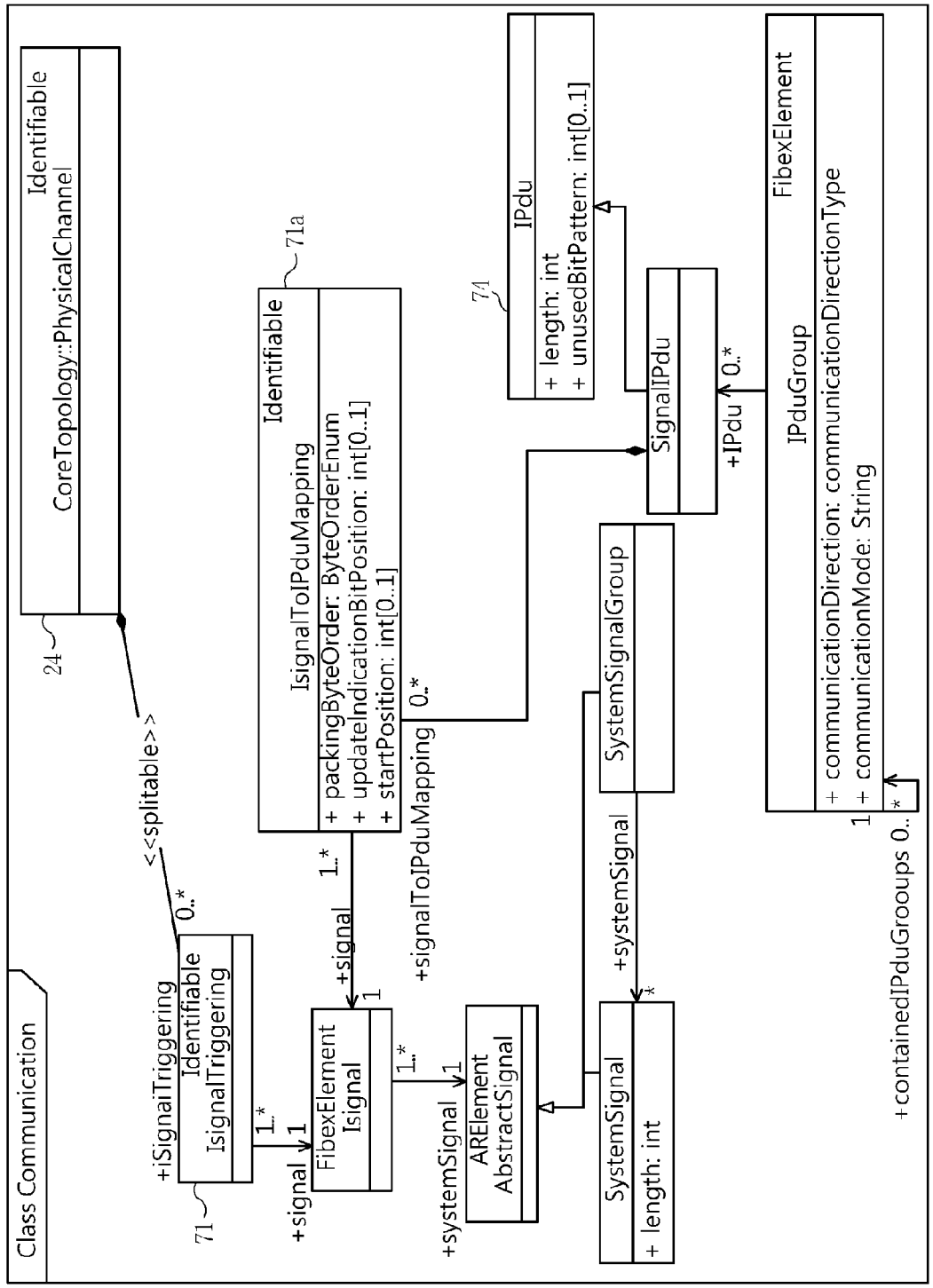

A gateway model 80 based on AUTOSAR according to an embodiment of the present invention has the form shown in FIGS. 8 to 10.

Referring to FIGS. 8 to 10, the gateway model 80 is implemented on the assumption that an ECU instance 811 generated during the above procedure of setting up the network structure functions as a gateway. That is, a gateway instance 81 is generated by referring to the ECU instance 811 functioning as the gateway. A mapping relationship with the gateway instance 81 is established by a frame mapping instance (FrameMapping) 82, an IPdu mapping instance (IPduMapping) 83, and a signal mapping instance (SignalMapping) 84.

The frame mapping instance 82 indicates a mapping relationship between frames to be used on different networks that are connected via the gateway. Here, the frame mapping instance 82 refers to frames that are set up by using the frame triggering instance 73 in the above-described communication data setup step.

The IPdu mapping instance 83 indicates a mapping relationship between IPdus contained in the frames mapped to each other. In other words, the IPdu mapping instance 83 includes a source IPdu reference instance (SourcePduRef) 83a and a target IPdu reference instance (TargetIPduRef) 83b corresponding to IPdus mapped to each other, that is, a source IPdu and a target IPdu. In an automotive communication protocol such as that for a Controller Area Network (CAN), only a single IPdu is contained in a single frame, but in a protocol such as FlexRay, one or more IPdus may be mapped to a single frame, so that mapping between IPdus is required.

For example, referring to FIGS. 8 and 9, the system signals are referred to by the IPdu 74 via an I Signal-to-IPdu mapping instance (ISignalToIPduMapping) 71a, and the IPdu triggering instance 72 refers to the information about frames mapped to each other by referring to the IPdu 74. Then, the IPdu mapping instance 83 detects a frame to which the source IPdu belongs by referring to the source IPdu reference instance 83a. Further, the IPdu mapping instance 83 detects a frame to which the target IPdu belongs by referring to the target IPdu reference instance 83b. The IPdu mapping instance 83 establishes a mapping relationship between the IPdus by mapping a source IPdu and a target IPdu, which are contained in the same frame, to each other.

The signal mapping instance 84 is configured to, when signals included in the IPdus between which the mapping relationship has been established via the IPdu mapping instance 83 are mapped to another IPdu via the gateway instance 81, set locations to which the signals are to be transferred.

For example, referring to FIGS. 8 and 10, system signals are referred to by the IPdu 74 via the I Signal-to-IPdu mapping instance (ISignalToIPduMapping) 71*a*, and the triggering instance 71 detects signals included in a communication cluster to which the source IPdu belongs, by referring to the I Signal-to-IPdu mapping instance 71*a*. Further, the signal triggering instance 71 detects signals included in a communication cluster to which the target IPdu belongs, by referring to the I Signal-to-IPdu mapping instance 71*a*. Then, the signal mapping instance 84 sets the locations of signals that are to be transferred to the communication cluster of the target IPdu when the source IPdu and the target IPdu contained in the same frame are mapped to each other, by referring to the signal triggering instance 71.

Since the above-described gateway model 80 based on AUTOSAR shown in FIGS. 8 to 10 is disclosed in detail in the specification of the System Template V3.1.0 of AUTOSAR, a detailed description thereof will be omitted.

Next, the gateway setup unit 300 for setting up the structure of the gateway model 80 as shown in FIGS. 8 to 10 will be described in detail with reference to FIGS. 11 to 13.

Figure 11:
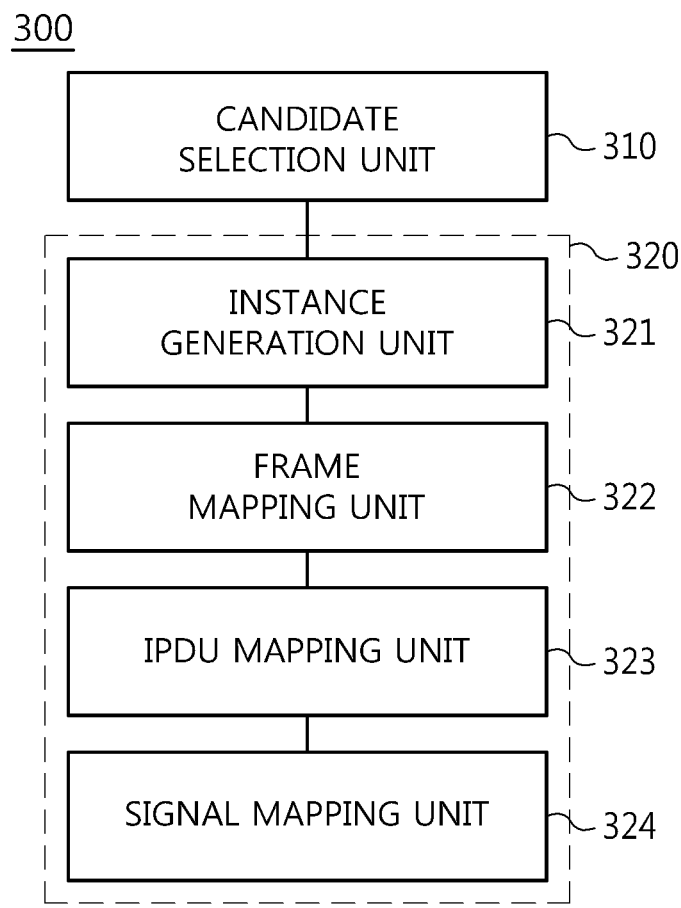
FIG. 11 is a configuration diagram showing the gateway setup unit of the apparatus for setting up the gateway for the AUTOSAR-based vehicle network shown in FIG. 1.
Figure 12:
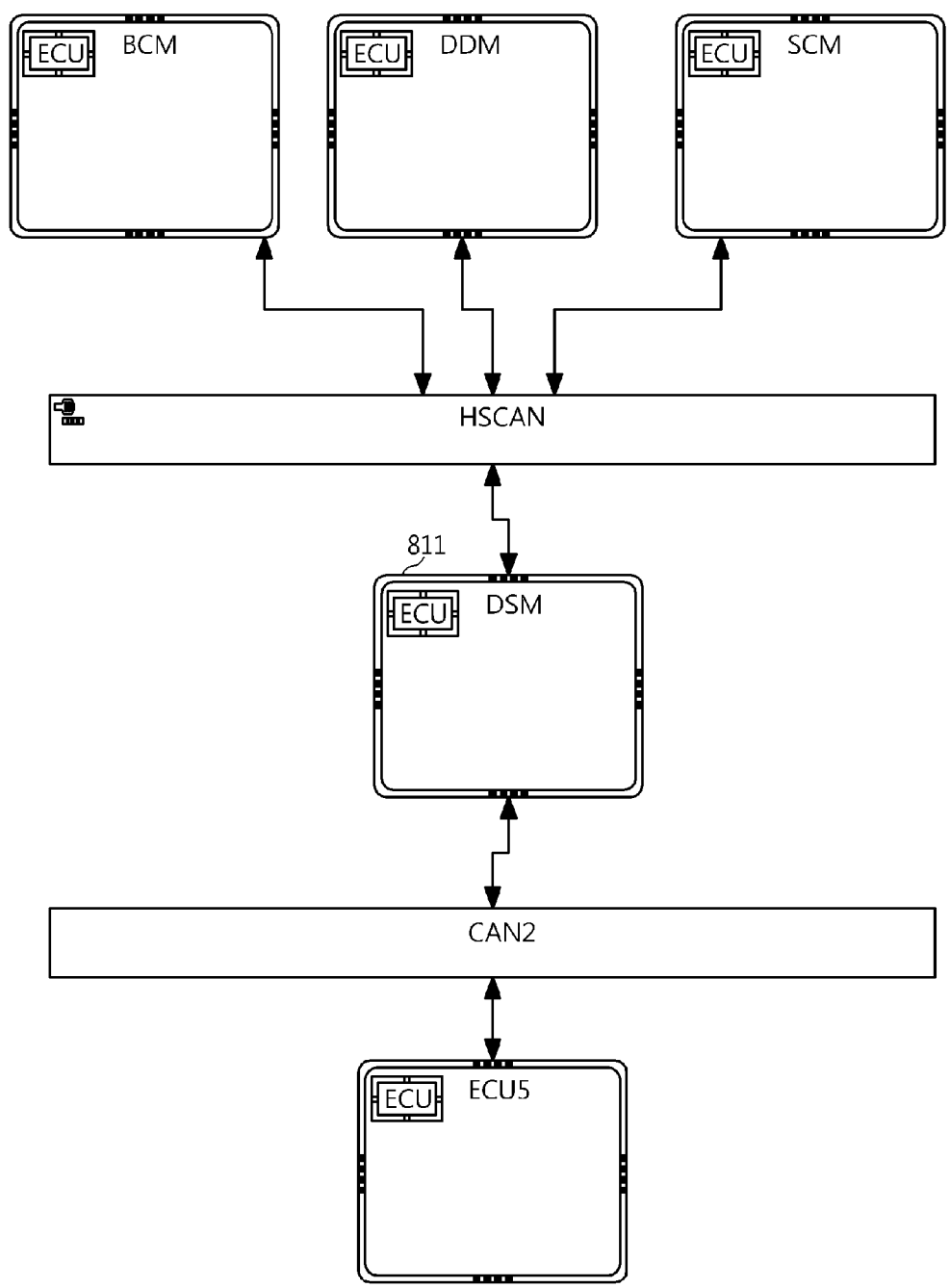
FIG. 12 is a diagram showing an example in which a gateway candidate is selected according to an embodiment of the present invention.

FIG. 11 is a configuration diagram showing the gateway setup unit 300 of the apparatus for setting up the gateway for the AUTOSAR-based vehicle network shown in FIG. 1. FIG. 12 is a diagram showing an example in which a gateway candidate is selected according to an embodiment of the present invention. FIG. 13 is a diagram showing an example of an instance generation screen according to an embodiment of the present invention.

Referring to FIGS. 8 to 11, the gateway setup unit 300 according to an embodiment of the present invention includes a candidate selection unit 310 and a gateway generation unit 320.

The candidate selection unit 310 selects a specific ECU as a gateway candidate when the specific ECU is connected to at least two communication clusters during the above procedure of setting up the network structure. For example, as shown in FIG. 12, the candidate selection unit 310 selects an ECU instance 811 as a gateway candidate because the ECU instance 811 is connected to a CAN2 communication cluster and a High Speed CAN (HSCAN) communication cluster during the procedure of setting up the network structure.

Referring back to FIGS. 8 and 11, the gateway generation unit 320 includes an instance generation unit 321, a frame mapping unit 322, an IPdu mapping unit 323, and a signal mapping unit 324.

The instance generation unit 321 selects the corresponding ECU as a gateway by using the context menu of the ECU selected as the candidate by the candidate selection unit 310, and then generates a gateway instance 81. In this case, the gateway instance 81 refers to the ECU instance 811 which will function as the gateway. Further, the instance generation unit 321 generates a frame mapping instance 82, an IPdu mapping instance 83, and a signal mapping instance 84 which correspond to the lower-layer instances of the gateway instance 81.

Figure 13:
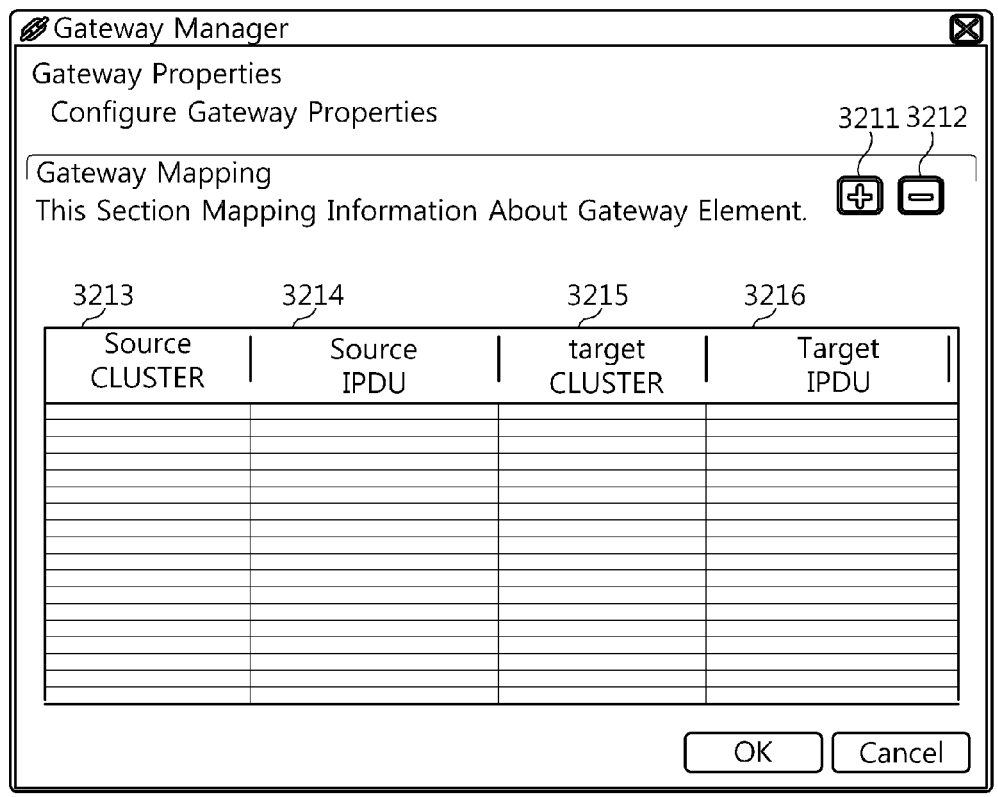
FIG. 13 is a diagram showing an example of an instance generation screen according to an embodiment of the present invention.

The instance generation unit 321 includes an instance generation screen provided with a plurality of input blocks capable of receiving instance generation input values required to generate instances from the user, and an example of the instance generation screen is depicted in FIG. 13. The instance generation screen is represented as shown in FIG. 13 in which a Graphical User Interface (GUI) is used, but is not limited to this example. The instance generation unit 321 generates instances in such a way that when the user adds an entry by using the button 3211 of the instance generation screen or deletes an entry by using a button 3212, an entry is added to or deleted from the instance generation screen.

In detail, referring to FIGS. 8 and 13, the instance generation unit 321 receives instance generation input values required to generate instances. In other words, when the user adds an entry by using the button 3211, the instance generation unit 321 generates an IPdu list belonging to the corresponding communication cluster in a source cluster block 3213 on the basis of the instance generation input values. Further, the instance generation unit 321 displays a source IPdu selected by the user from the IPdu list on a source IPdu block 3214. The instance generation unit 321 generates an IPdu list belonging to the corresponding communication cluster in a target cluster block 3215 on the basis of the instance generation input values. Further, the instance generation unit 321 displays a target IPdu selected by the user from the IPdu list on a target IPdu block 3216. In this case, a list of signals included in the source IPdu is displayed in the procedure of selecting the target IPdu. When the user selects relevant signals, storage locations of the target IPdu where the selected signals are to be stored are selected.

Further, the instance generation unit 321 generates a frame mapping instance 82 which will perform mapping between frames including source IPdus and target IPdus, on the basis of information selected by the user on the instance generation screen. Furthermore, the instance generation unit 321 generates an IPdu mapping instance 83 including a source IPdu reference instance 83*a* corresponding to the source IPdus and a target IPdu reference instance 83*b* corresponding to the target IPdus. The instance generation unit 321 generates a signal mapping instance 84 for setting up locations at which signals are to be transferred to the communication cluster when signals of a source IPdu and the signals of a target IPdu are mapped to each other.

The frame mapping unit 322 maps frames including source IPdus to frames including target IPdus by using the frame mapping instance 82 generated by the instance generation unit 321. That is, the frame mapping unit 322 establishes a mapping relationship between the frames including the source IPdus and the frames including the target IPdus by referring to the frame triggering instance 73 including information about frames to be transmitted through a specific channel on the basis of the frame mapping instance 82.

The IPdu mapping unit 323 establishes a mapping relationship between IPdus by mapping a source IPdu and a target IPdu contained in the same frame to each other, by using the IPdu mapping instance 83 generated by the instance generation unit 321. That is, the IPdu mapping unit 323 establishes a mapping relationship between the IPdus by mapping a source IPdu and a target IPdu contained in the same frame to each other by referring to the IPdu triggering instance 72 based on the source IPdu reference instance 83*a* and the target IPdu reference instance 83*b* of the IPdu mapping instance 83.

The signal mapping unit 324 maps signals included in the source IPdu and the target IPdu, between which the mapping relationship has been established, to each other by using the signal mapping instance 84 generated by the instance generation unit 321. That is, the signal mapping unit 324 sets up locations at which signals selected by the user from among the signals included in the source IPdu are to be transferred to the communication cluster of the target IPdu, when the source IPdu and the target IPdu contained in the same frame are mapped to each other by referring to the signal triggering instance 71 based on the signal mapping instance 84.

Next, a method of setting up a gateway for an AUTOSAR-based vehicle network will be described in detail with reference to FIG. 14.

Figure 14:
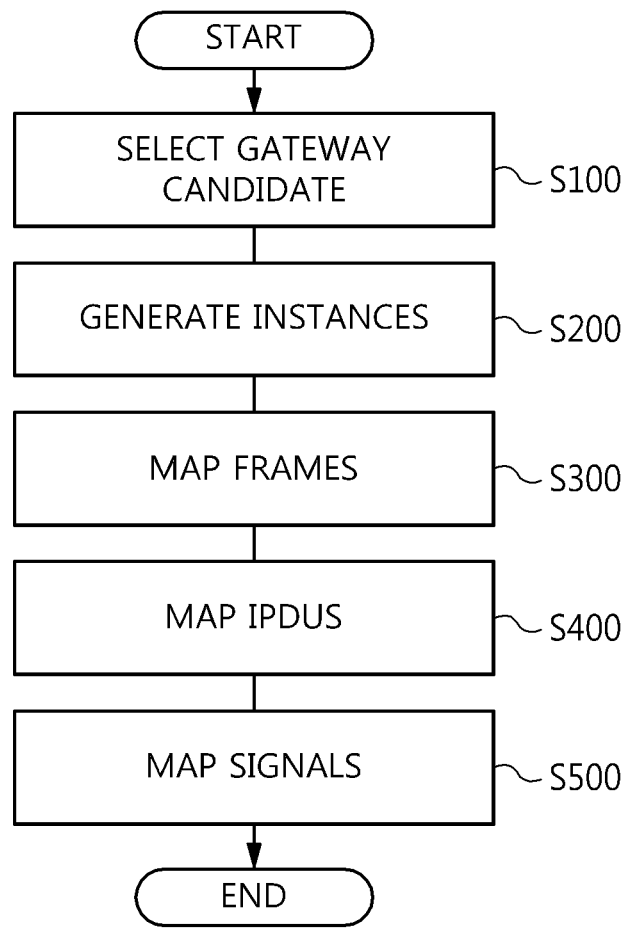
FIG. 14 is a flowchart showing a method of setting up a gateway for an AUTOSAR-based vehicle network according to an embodiment of the present invention.

FIG. 14 is a flowchart showing a method of setting up a gateway for an AUTOSAR-based vehicle network according to an embodiment of the present invention. In FIG. 14, it is assumed that a communication channel between ECUs corresponding to the components of vehicle network communication is allocated based on AUTOSAR, and a network structure is set up based on the allocated communication channel between the ECUs and that communication data transmitted through the communication channel between the ECUs is set up by using a specific wizard.

Referring to FIGS. 8 and 14, in the gateway setup apparatus for the AUTOSAR-based vehicle network according to the embodiment of the present invention, the candidate selection unit 310 of the gateway setup unit 300 determines whether a specific ECU is connected to one or more communication clusters during the procedure of generating a network structure based on AUTOSAR. During the procedure, if a specific ECU instance 811 is connected to one or more communication clusters, the candidate selection unit 310 selects the corresponding ECU instance 811 as a gateway candidate at step S100.

The instance generation unit 321 selects the corresponding ECU instance 811, selected as the candidate, as the gateway by using the context menu of the ECU instance 811, and then generates a gateway instance 81. On the basis of instance generation input values entered by the user to generate instances, the instance generation unit 321 displays a relevant communication cluster on the source cluster block 3213 of the instance generation screen, displays a relevant source IPdu on the source IPdu block 3214, displays a relevant communication cluster on the target cluster block 3215, and displays a relevant target IPdu on the target IPdu block 3216 [see FIG. 13]. The instance generation unit 321 generates a frame mapping instance 82, an IPdu mapping instance 83, and a signal mapping instance 84 based on information selected by the user from the instance generation screen at step S200.

When the generation of all the instances for setting up the gateway has been completed, the frame mapping unit 322 establishes a mapping relationship between a frame containing the source IPdu and a frame containing the target IPdu by referring to the frame triggering instance 73 based on the frame mapping instance 82 at step S300.

If the establishment of the mapping relationship between the frames has been completed, the IPdu mapping unit 323 establishes a mapping relationship between IPdus by mapping the source IPdu and the target IPdu contained in the same frame to each other, by referring to the IPdu triggering instance 72 based on a source IPdu reference instance 83a and a target IPdu reference instance 83b included in the IPdu mapping instance 83 at step S400.

If the establishment of the mapping relationship between IPdus has been completed, the signal mapping unit 324 sets up locations at which signals selected by the user from among signals included in the source IPdu are to be transferred to the communication cluster of the target IPdu when the source IPdu and the target IPdu contained in the same frame are mapped to each other, by referring to the signal triggering instance 71 based on the signal mapping instance 84 at step S500.

As described above, the method of setting up the gateway for the AUTOSAR-based vehicle network according to the embodiment of the present invention allows an electronics application developer to more easily set up the gateway model of the vehicle network even if the developer does not know the configuration of a complicated network architecture model based on AUTOSAR.

As described above, optimal embodiments of the present invention have been disclosed in the drawings and the present specification. In this case, although specific terms have been used, those terms are merely intended to describe the present invention and are not intended to limit the meanings and the scope of the present invention as disclosed in the accompanying claims. Therefore, those skilled in the art will appreciate that various modifications and other equivalent embodiments are also possible given the above description. Therefore, the technical scope of the present invention should be defined by the technical spirit of the accompanying claims.

What is claimed is:

1. An apparatus for setting up a gateway for an AUTomotive Open System ARchitecture (AUTOSAR)-based vehicle network, comprising:
   a computing device, and
   a storage medium containing program instructions embodied therein, execution of which by the computing device causes the apparatus to provide functions of:
      a candidate selection unit for selecting an Electronic Control Unit (ECU) connected to at least two communication clusters, from among a plurality of ECUs, as a gateway candidate; and
      a gateway generation unit for generating a gateway meta-model based on instance generation input values entered by a user, the gateway meta-model including
         a gateway instance generated with reference to the ECU selected by the candidate selection unit,
         a frame mapping instance for performing mapping between frames including source Interaction layer Protocol Data Units (IPdus) and target IPdus, based on the instance generation input values,
         an IPdu mapping instance for establishing mapping between IPdus by mapping a source IPdu and a target IPdu contained in an identical frame to each other, and
         a signal mapping instance for setting up locations at which signals are to be transferred to a communication cluster of the target IPdu when the source IPdu and the target IPdu contained in the identical frame are mapped to each other.

2. The apparatus of claim 1, wherein the gateway generation unit comprises an instance generation unit for generating the gateway instance based on a context menu of the ECU.

3. The apparatus of claim 1, wherein the gateway generation unit comprises a frame mapping unit for establishing the mapping between the frames including the source IPdus and the target IPdus by referring to a previously generated frame triggering instance based on the frame mapping instance.

4. The apparatus of claim 1, wherein:
   the IPdu mapping instance comprises
      a source IPdu reference instance corresponding to the source IPdu contained in the identical frame, and
      a target IPdu reference instance corresponding to the target IPdu contained in the identical frame, and
   the gateway generation unit comprises
      an IPdu mapping unit for establishing the mapping relationship between the source IPdu and the target IPdu by referring to a previously generated IPdu triggering instance based on the source IPdu reference instance and the target IPdu reference instance.

5. The apparatus of claim 1, wherein the gateway generation unit comprises a signal mapping unit for setting up the locations of signals by referring to a previously generated signal triggering instance based on the signal mapping instance.

6. The apparatus of claim 1, wherein the apparatus is based on AUTomotive Open System ARchitecture (AUTOSAR).

7. The apparatus of claim 2, wherein the instance generation unit comprises an instance generation screen having a plurality of input blocks for receiving the instance generation input values entered by the user.

8. The apparatus of claim 2, wherein the plurality of ECUs are generated during a procedure of setting up a vehicle network structure model and a communication data structure model in advance before the gateway meta-model is generated.

9. A method of using a gateway setup apparatus including a computing device to set up a gateway for an AUTomotive Open System ARchitecture (AUTOSAR)-based vehicle network, comprising:
   selecting, using the computing device via execution of program instructions thereby, an Electronic Control Unit (ECU) connected to at least two communication clusters, from among a plurality of ECUs, as a gateway candidate;
   generating, using the computing device, a gateway meta-model based on instance generation input values entered by a user, including
     generating a gateway instance with reference to the ECU,
     generating a frame mapping instance for performing mapping between frames including source Interaction layer Protocol Data Units (IPdus) and target IPdus, based on the instance generation input values,
     generating an IPdu mapping instance for establishing mapping between IPdus by mapping a source IPdu and a target IPdu contained in an identical frame to each other, and
     generating a signal mapping instance for setting up locations at which signals are to be transferred to a communication cluster of the target IPdu when the source IPdu and the target IPdu contained in the identical frame are mapped to each other.

10. The method of claim 9, wherein the generating the gateway instance comprises generating the gateway instance based on a context menu of the ECU.

11. The method of claim 9, wherein the generating the frame mapping instance comprises:
   referring to a previously generated frame triggering instance based on the frame mapping instance; and
   establishing the mapping between the frames including source IPdus and target IPdus which will be used in different communication clusters.

12. The method of claim 9, wherein the generating the IPdu mapping instance comprises:
   generating a source IPdu reference instance corresponding to the source IPdu;
   generating a target IPdu reference instance corresponding to the target IPdu; and
   establishing the mapping between the source IPdu and the target IPdu by referring to a previously generated IPdu triggering instance based on the source IPdu reference instance and the target IPdu reference instance.

13. The method of claim 9, wherein the generating the signal mapping instance comprises setting up the locations of signals by referring to a previously generated triggering instance based on the signal mapping instance.

* * * * *